United States Patent [19]
Alberkrack et al.

[11] Patent Number: 5,525,893
[45] Date of Patent: Jun. 11, 1996

[54] A.C. LINE CONNECTED BATTERY CHARGER

[75] Inventors: Jade H. Alberkrack, Tempe, Ariz.;
Theodore V. Lester, Schiller Park, Ill.

[73] Assignee: Motorola, Inc., Schaumburg, Ill.

[21] Appl. No.: 235,749

[22] Filed: Apr. 29, 1994

[51] Int. Cl.$^6$ .................................................... H02J 7/10
[52] U.S. Cl. .................................................. 320/40; 320/54
[58] Field of Search .................................. 320/39, 40, 49, 320/54, 57

[56] References Cited

U.S. PATENT DOCUMENTS 4,658,199  4/1987  Hoffman ...................... 320/21
5,160,879  11/1992  Tortola et al. ................ 320/2
5,198,743  3/1993  McClure et al. ............. 320/40 X Primary Examiner—Peter S. Wong
Assistant Examiner—Edward Tso
Attorney, Agent, or Firm—Kenneth M. Massaroni

[57] ABSTRACT

A battery charging circuit device (10) includes a rectifier (16) and current controller (44) for directing current away from the battery (30). The rectifier (16) provides a current curve which is controlled by the current controller (44) so as to prevent the application of excess current to the battery (30) being charged in the circuit (10).

12 Claims, 6 Drawing Sheets

A.C. LINE CONNECTED BATTERY CHARGER

TECHNICAL FIELD

This invention relates in general to current regulating circuits and more particularly to current regulating circuits for use in battery charging devices.

BACKGROUND OF THE INVENTION

With the recent proliferation of portable, battery-powered devices, there has been a concurrent demand for portable, easy to use battery charging devices. The ideal portable (i.e. travel) battery charger would be a low-cost, low-weight device which is plugged directly into a wall outlet. Such a device would require built-in protection from overcurrent while charging directly from a wall outlet. Moreover, in an effort to reduce cost and weight, such a device should avoid using numerous other components such as a step-down transformer, series dropping resistor, or capacitive reactance dropper.

Unfortunately, when doing away with these types of devices, it has heretofore been the case that the charging apparatus does not provide adequate protection to batteries put into the device. Accordingly, overcharge and other dangerous situations are more likely to occur in such devices.

Accordingly, there exists a need for a portable, lightweight battery charging device that provides the user thereof with adequate safety considerations, while not detrimentally affecting the batteries disposed therein.

DETAILED DESCRIPTION OF THE PREFERRED EMBODIMENT

Figure 1:
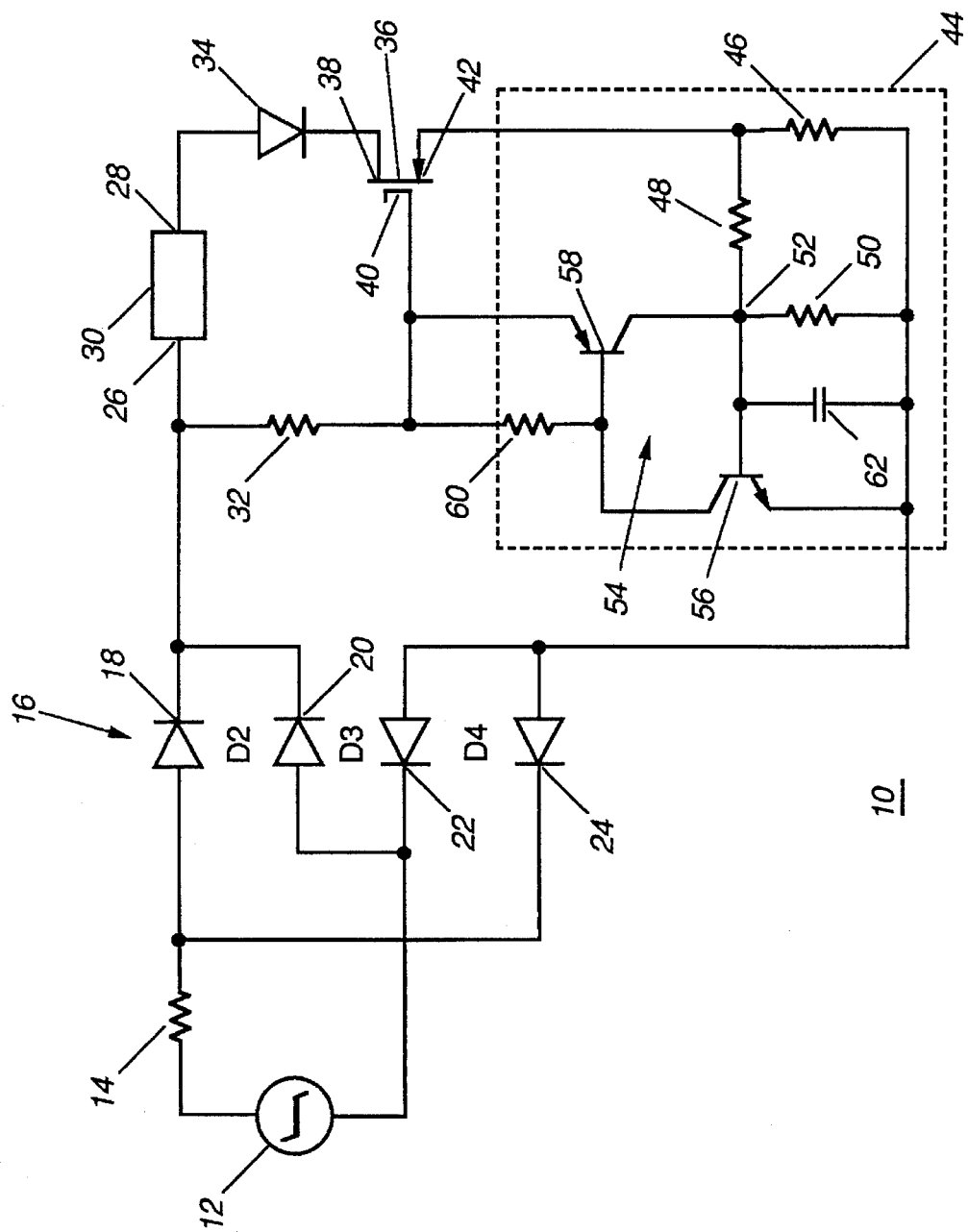
FIG. 1 is a circuit diagram illustrating a charging circuit in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein a schematic circuit diagram of a battery charging circuit device, for use in, for example, a battery charging device, in accordance with the instant invention. The battery circuit (10) includes a source of power (12). The source of power (12) may be an alternating current source input. The alternating current source of power (12) may be, for example, a wall outlet.

The circuit device (10) may further include a first resistor (14) electrically coupled between said source of power (12) and a full wave bridge rectifier (16). The resistor (14) serves as a peak current limiter and input fuse. The value of the resistor (14) is selected to limit the peak non-recurrent surge and successive peaks. The resistor (14) also sets the rate of current increase as voltage increases. It should therefore be understood that while FIG. 1 illustrates resistor (14), the device may be any device capable of providing AC impedance.

The full wave bridge rectifier (16) includes a plurality of diodes (18, 20, 22, & 24). More specifically, diodes (18 and 20) are configured so that the anode thereof is facing the source of power (12). Conversely, diodes (22 and 24) are configured so that the cathode is facing the source of power.

The circuit further comprises at least a first and a second battery contact (26 and 28) which are adapted to engage a battery (30) and to apply a charging current thereto. Operatively disposed between the first battery contact (26) and the full wave bridge rectifier (16) is a second resistor (32). Resistor (32) is adapted to function as an enabling resistor which provides bias for a diode (34) and holding current for the latching circuit means (as described in greater detail hereinbelow).

Disposed on the side of said battery (30) beyond said second battery contact (28) is diode (34). Diode (34) is provided so as to afford reverse conduction protection to the battery. More particularly, current cannot be reversed biased to the battery. Diode (34) further prevents battery conduction when the circuit device (10) is unplugged from the source of power (12). The circuit (10) further includes a low frequency series pass switch (36). The switch (36) may be, for example, a MOSFET wherein the drain (38) of the MOSFET is electrically connected to the anode of diode (34), the gate (40) of MOSFET (36) is electrically coupled to the enabling resistor (32) and the source (42) of the MOSFET is connected to a disabling device as described in greater detail hereinbelow.

Both the enabling resistor (32) and MOSFET (36) are electrically coupled to a disabling device identified by box (44). The disabling device (44) is adapted to direct current away from the battery (30) when the input current exceeds a peak current setting. In this away, the battery is not damaged nor is a dangerous overcharge situation allowed to occur. Heretofore, avoiding such a situation required the presence of expensive circuitry or electronic components.

The disabling device (44) includes a current sensing resistor (46). The current sensing resistor (46), in concert with peak current setting resistors (48 and 50), is adapted to determine whether or not the incoming current is in excess of a preset current peak. The preset current peak is determined by the current sensing resistor (46). Resistors (48 and 50) are electrically coupled at node (52) which is itself electrically coupled to a latching circuit means (54) such as an R/S flip-flop, or a silicon control rectifier (hereinafter "SCR"). As illustrated in FIG. 1, the latching circuit means is preferably an SCR. The silicon control rectifier (54) comprises first and second bi-polar transistor (56 and 58) and resistor (60) and capacitor (62).

Figure 2:
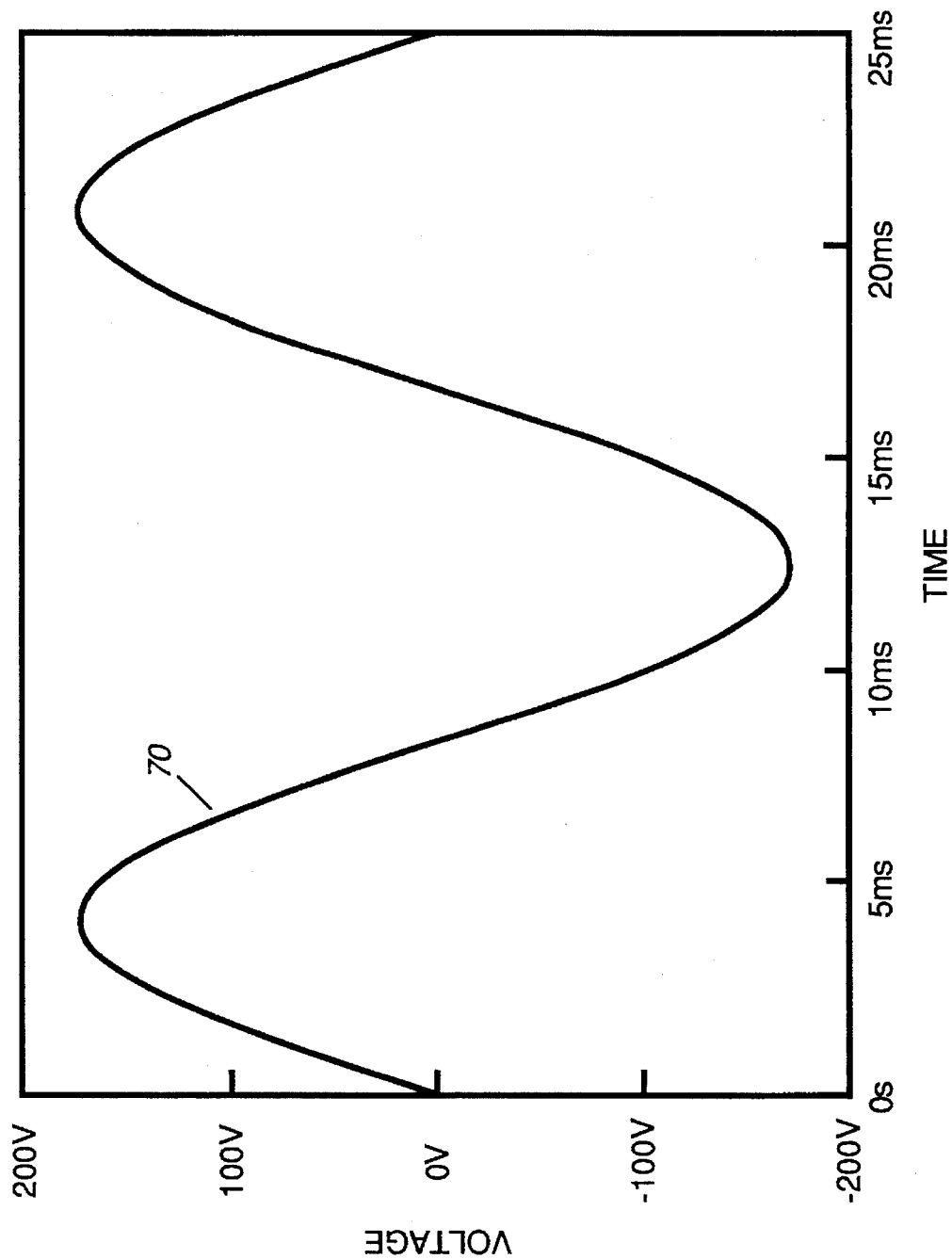
FIG. 2 is a chart illustrating line input in terms of voltage versus time.

Referring now to FIG. 2, there is illustrated therein a chart of the voltage available from an AC source of power (12) such as a wall outlet. More particularly, line (70) of FIG. 2 illustrates the voltage vs. time for the alternating current, prior to the current being passed through the full-wave bridge rectifier (16) of FIG. 1.

Figure 3:
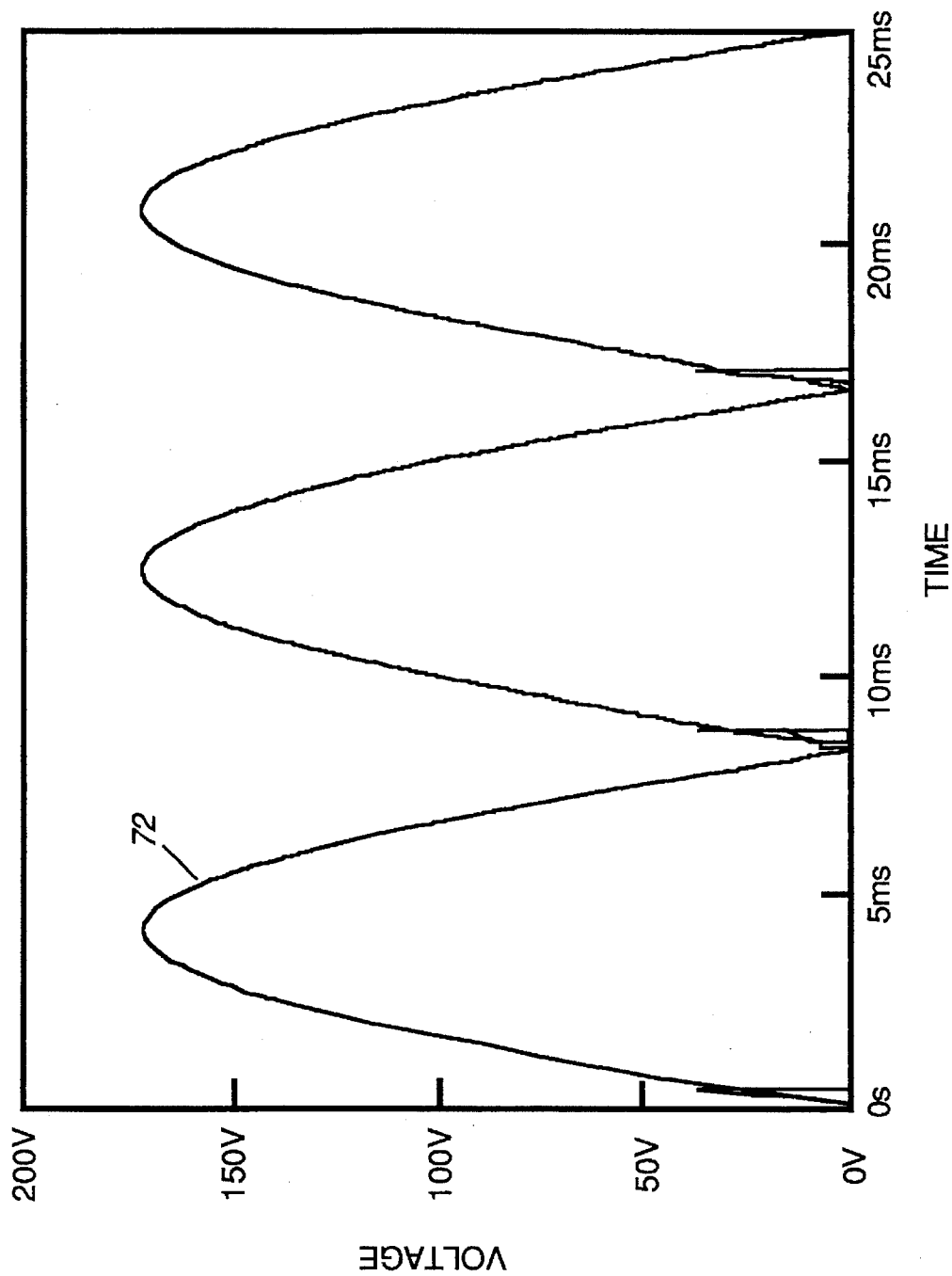
FIG. 3 is a chart illustrating the output resulting from the input of FIG. 2 after passing the full wave bridge rectifier as illustrated in FIG. 1, in accordance with the invention.

Referring now to FIG. 3, there is illustrated therein the output which results from the full wave bridge rectifier (16) of FIG. 1, given the inputs of FIG. 2. Specifically the output is a haversine curve (72) in which voltage versus time is plotted, and in which current begins at "0" rises rapidly to a cut-off peak of about 170 V, and falls rapidly back to "0". At each rise from "0" of the haversine curve developed at the full-wave rectifier (16), transistor (36) is biased into the "on" condition, i.e., is enabled by resistor (32), by the rising positive voltage aided by voltage available from the battery (30) being charged. This results in a ramp of current delivered to the battery by transistor (36). Resistor (46) is a current sensing resistor. Resistors (48 and 50) are used to set the peak current at which transistor (36) conduction is terminated. The capacitor (62) may be provided to afford a degree of immunity from electronic noise which may appear as a result of the power source (12).

Figure 4:
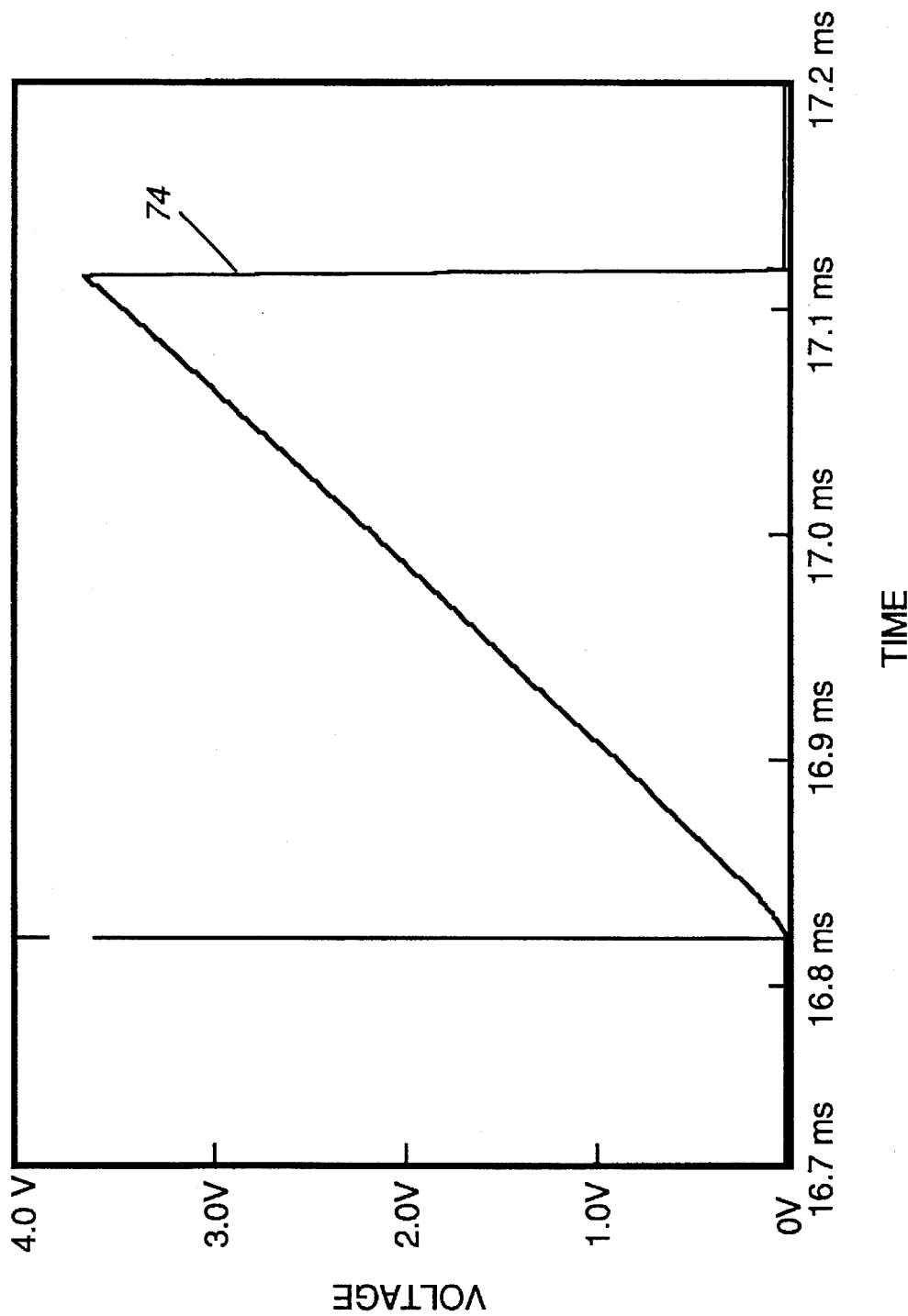
FIG. 4 illustrates the current pulse profile of a charging current applied to a battery via a charging circuit in accordance with the instant invention.

When the current through transistor (36) reaches a value so the voltage drop in resistor (46) divided by resistors (48 and 50) is sufficient to turn the base of transistor (56) "on", transistors (56 and 58) turn on in a regenerative manner and latch into the "on" condition. This removes bias from the gate of transistor (36), terminating the conduction thereof. Once the haversine wave (72) falls to near "0" volts, transistors (56 and 58) will stop conducting (i.e. unlatch) and the action described hereinabove will repeat. The resulting current is a series of sawtooth pulses (74) such as those illustrated in FIG. 4, wherein the average value is the battery charging current.

Figure 5:
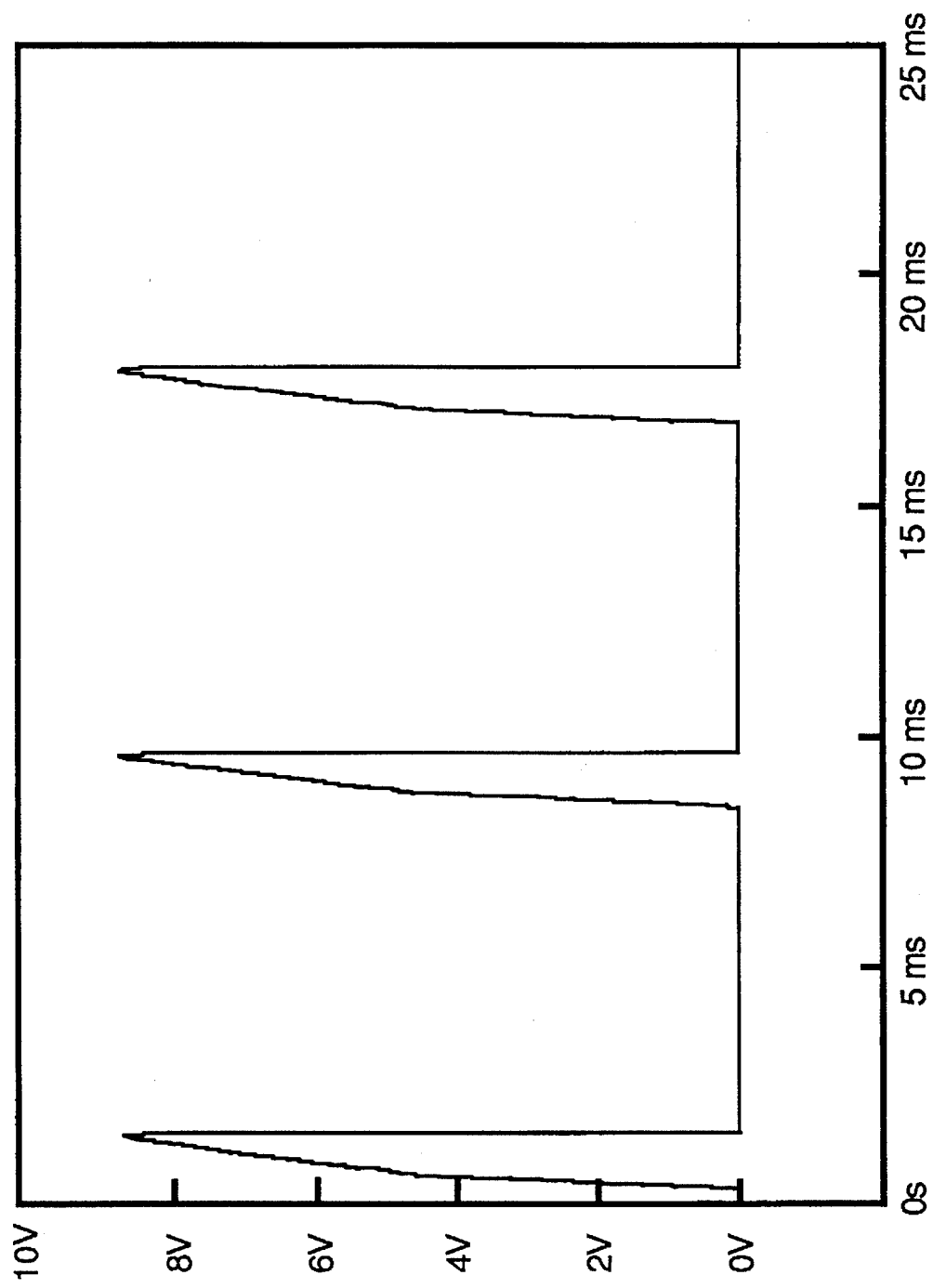
FIG. 5 illustrates single current pulse charging which results from a device in accordance with the instant invention.
Figure 6:
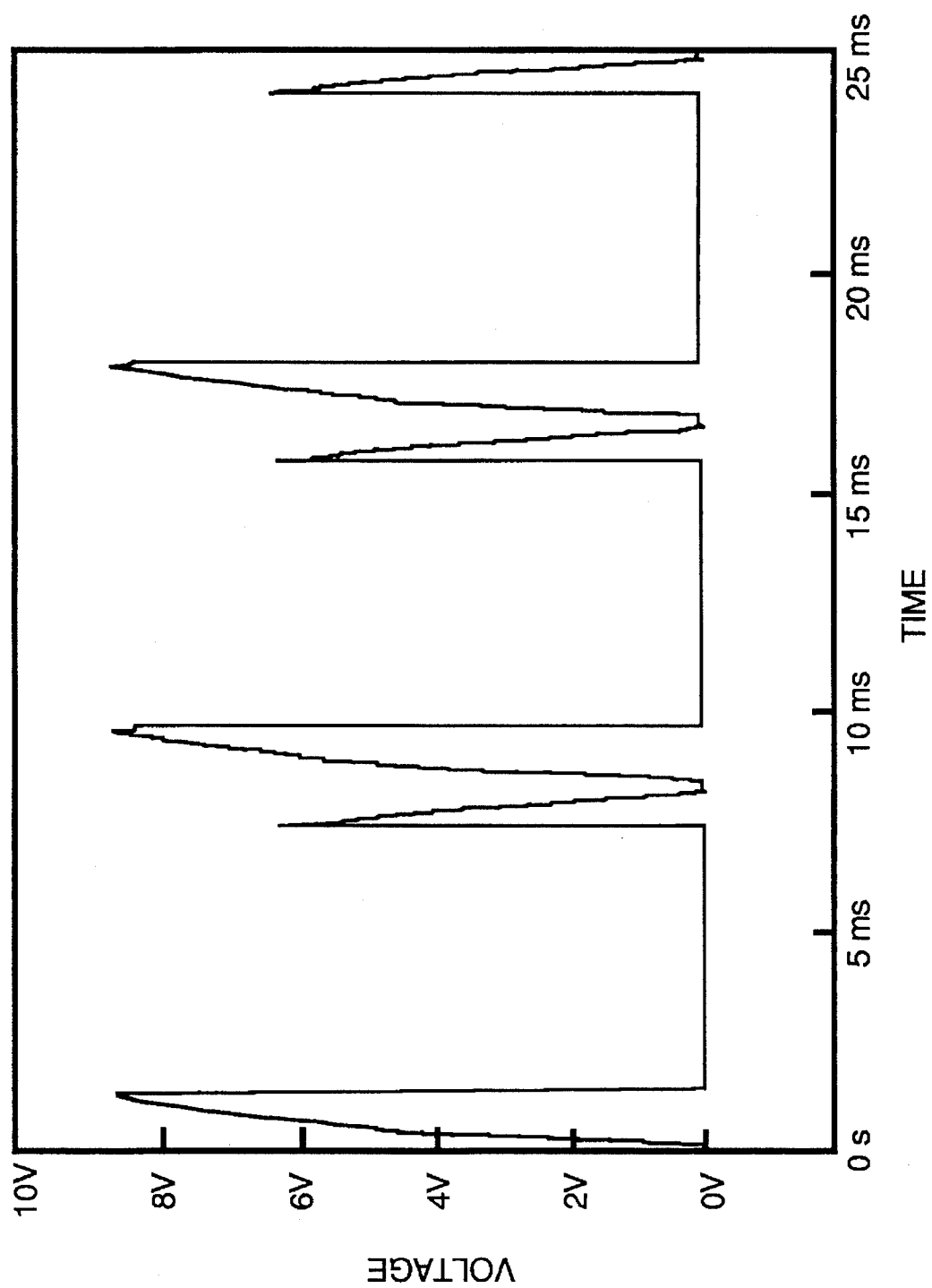
FIG. 6 illustrates double current pulse charging which results from an alternative embodiment of a device in accordance with the instant invention.

It is also to be noted that a second battery charging pulse may be obtained during the downward slope of the haversine curve of FIG. 3. This may be done by modifying the latch holding current, as by changing the value of resistor 60. This has the effect of reducing the ratio of the peak switch current to the average charging current, thereby reducing the battery charging time. FIGS. 5 and 6 show a direct comparison of a single pulse charging method (FIG. 5) versus a double current pulse charging method (FIG. 6)

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery charging circuit for use in an apparatus adapted to charge a rechargeable battery, said circuit comprising:

rectification means including, a full-wave bridge rectifier;

a current sensing resistor;

a MOSFET operatively disposed between said current sensing resistor and a battery to be charged by said charging circuit;

peak current setting means; and a current peak limiting means.

2. A charging circuit as defined in claim 1, wherein said current peak setting means comprises at least a first and a second resistor, said first and second resistors operatively disposed between said MOSFET and said current peak limiting means and connected to said current peak limiting means.

3. A charging circuit as defined in claim 1, wherein the peak current setting means comprises a latching circuit means electrically coupled to said full-wave bridge rectifier.

4. A charging circuit as defined in claim 3, wherein said latching circuit means further comprise a silicon control rectifier.

5. A charging circuit as defined in claim 3, wherein said current sensing resistor is electrically coupled to said peak current setting means.

6. A charging circuit as defined in claim 1, further including at least one diode operatively disposed between said low frequency series pass switch and said rechargeable battery, so as to provide said battery with reverse conduction protection.

7. A battery charging apparatus comprising:

a source of power adapted to provide alternating current;

a full-wave bridge rectifier adapted to convert alternating current from said source of power to direct current;

at least a first and second battery contact for engaging a battery in said charging apparatus, said battery contacts further adapted to apply a charging current to said battery;

a disabling device adapted to sense the current supplied by said source of power;

an enabling resistor electrically disposed between said full-wave bridge rectifier, said first battery contact and said disabling device; and a low frequency series pass switch electrically disposed between said second battery contact and disabling device.

8. A battery charging apparatus as in claim 7, wherein said disabling device further includes;

a current sensing resistor;

a peak current setting means; and a silicon control rectifier.

9. A battery charging apparatus as defined in claim 8, wherein said low frequency series pass switch is a MOSFET operatively disposed between said current sensing resistor and a battery to be charged.

10. A battery charging apparatus as defined in claim 7, wherein said peak current setting means comprises at least a first and a second resistor, said first and second resistors operatively disposed between said low frequency series pass switch and said silicon control rectifier.

11. A battery charging apparatus as defined in claim 10, wherein said current sensing resistor is electrically coupled to said peak current setting means.

12. A battery charging apparatus as defined in claim 7, further including at least one diode operatively disposed between said low frequency series pass switch and said rechargeable battery, so as to provide said battery with reverse conduction protection.

* * * * *